(12) United States Patent
Sanma et al.

(10) Patent No.: US 8,704,652 B2
(45) Date of Patent: Apr. 22, 2014

(54) INFORMATION PROVIDING APPARATUS

(71) Applicants: DENSO CORPORATION, Kariya (JP); Nippon Soken, Inc., Aichi (JP)

(72) Inventors: Norio Sanma, Okazaki (JP); Sei Iguchi, Okazaki (JP); Daisuke Sugiura, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/662,868

(22) Filed: Oct. 29, 2012

(65) Prior Publication Data

US 2013/0127610 A1    May 23, 2013

(30) Foreign Application Priority Data

Nov. 18, 2011   (JP) ................................. 2011-252866

(51) Int. Cl.

| | |
|---|---|
| *B60Q 1/00* | (2006.01) |
| *H04B 3/36* | (2006.01) |
| *G09B 9/02* | (2006.01) |
| *B62D 6/00* | (2006.01) |
| *B60S 9/00* | (2006.01) |
| *B62D 3/00* | (2006.01) |
| *A01B 69/00* | (2006.01) |

(52) U.S. Cl.
USPC ................... 340/438; 340/407.1; 340/425.5; 434/29; 180/6.2; 180/204; 180/400; 701/41

(58) Field of Classification Search
USPC ........................................................ 340/438
See application file for complete search history.

(56) References Cited

U.S. PATENT DOCUMENTS

| | | | |
|---|---|---|---|
| 7,902,693 B2 * | 3/2011 | Hijikata et al. ............... | 307/10.1 |
| 2004/0025624 A1 | 2/2004 | Kreuzer | |
| 2005/0285758 A1 | 12/2005 | Matsukawa et al. | |
| 2006/0097857 A1 * | 5/2006 | Osaka et al. .................. | 340/435 |
| 2008/0174415 A1 | 7/2008 | Tanida et al. | |
| 2012/0242564 A1 * | 9/2012 | Morishita ..................... | 345/102 |

FOREIGN PATENT DOCUMENTS

| | | |
|---|---|---|
| JP | 2003-300468 A | 10/2003 |
| JP | 2009-1094 A | 1/2008 |
| JP | 2010-260439 A | 11/2010 |
| JP | 2010-269762 A | 12/2010 |

OTHER PUBLICATIONS

Office Action mailed Feb. 12, 2014 issued in corresponding JP patent application No. 2011-252866 (and English translation).

* cited by examiner

*Primary Examiner* — Jennifer Mehmood
*Assistant Examiner* — Pameshanand Mahase
(74) *Attorney, Agent, or Firm* — Posz Law Group, PLC

(57) ABSTRACT

An information providing apparatus includes a tactile information provider and a controller. The tactile information provider is arranged within a rim portion of a steering wheel of a vehicle and provides a tactile sense to a driver. The controller controls the tactile information provider to provide support information to the driver. The support information is defined as information that supports a driving of the vehicle. The tactile information provider includes a trench arranged in a circumferential direction of the rim portion, a ring-shaped ring portion, and a driving portion. The ring portion is rotatably arranged in the trench and has an exposed surface such that the exposed surface contacts with at least one hand of the driver. The driving portion is controlled by the controller to drive the ring potion rotate in the circumferential direction to provide the support information to the driver.

7 Claims, 12 Drawing Sheets

INFORMATION PROVIDING APPARATUS

CROSS REFERENCE TO RELATED APPLICATION

This application is based on Japanese Patent Application No. 2011-252866 filed on Nov. 18, 2011, the disclosure of which is incorporated herein by reference.

TECHNICAL FIELD

The present disclosure relates to an information providing apparatus, which transmits support information necessary for a driving of a vehicle, to a driver of the vehicle via a steering wheel.

BACKGROUND

As disclosed in JP-A-2009-001094, an information providing apparatus, which provides necessary support information for a driving via a steering wheel of the vehicle, is known. In JP-A-2009-001094, a steering wheel includes motors and motor-driven elastic members. The motors and elastic members are equipped to a rim portion of the steering wheel. When the motors drive the elastic members to operate, the elastic members expand in an external direction. When the elastic members expand in the external direction, hands of a driver are irritated by the elastic members during a manipulation to the steering wheel. The elastic members may irritate the hands of the driver by sequentially expanding each elastic member in a circumferential direction of the rim portion. Further, the motors may drive all the elastic members simultaneously so that the hands of the driver are irritated by the expansions of all the elastic members, which are equipped to the rim portion of the steering wheel.

Further, JP-A-2008-149844 (corresponding to US 2008/0174415 A) discloses another apparatus for providing necessary support information for a driving via a steering wheel. In JP-A-2008-149844, on each of left side and right side of a rim portion of the steering wheel, multiple rods are arranged into a rectangular array. Each of the rods is disposed in a standby position. Further, each rod is connected to a corresponding motor so that each rod is vibrated when the corresponding motor is driven. The rods disposed on the left side of the rim portion and the rods disposed on the right side of the rim portion switch to vibrate based on a vehicle state in order to transmit information relative to a vehicle state such as a wobble state to the driver.

In JP-A-2009-001094, the elastic members, which correspond to an information providing portion, are separately arranged with one another. Thus, a configuration of the information providing apparatus is complicated and a controlling of the separate information providing portion is difficult.

In JP-A-2008-149844, the rods operate as an information providing portion. Further, a region where the information providing portion is arranged corresponds to an information providing region. When the information providing region needs to be extended, the number of the rods and the number of the corresponding motors need to be increased.

SUMMARY

In view of the foregoing difficulties, it is an object of the present disclosure to provide an information providing apparatus for a vehicle, which easily enlarges an information providing region with a simple configuration and a low cost.

According to an aspect of the present disclosure, an information providing apparatus for a vehicle includes a tactile information provider and a controller. The tactile information provider is arranged within a rim portion of a steering wheel of a vehicle, and provides a tactile sense to a driver of the vehicle. The controller controls the tactile information provider to provide support information to the driver. The support information is defined as information that supports a driving of the vehicle. The tactile information provider includes a trench, a ring portion, and a driving portion. The trench is arranged in a circumferential direction of the rim portion. The ring portion has a ring-shape and is rotatably arranged in the trench. The ring portion has an exposed surface such that the exposed surface contacts with at least one hand of the driver. The driving portion drives the ring portion to rotate in the circumferential direction. The controller controls the driving portion to rotate the ring portion so that the ring portion provides the support information to the driver.

In the above apparatus, the ring portion having the ring-shape is arranged in the circumferential direction of the rim portion. The ring portion rotates in the circumferential direction in order to provide the support information to the driver. Thus, an information providing region, which provides the support information to the driver via the tactile sense, is enlarged with a simple configuration and a low cost. Further, the support information is transmitted to the driver via the tactile sense. Since, the tactile sense is less likely to be explained in various ways, the support information is reliably transmitted to the driver in an easy-to-understand manner.

BRIEF DESCRIPTION OF THE DRAWINGS

The above and other objects, features and advantages of the present disclosure will become more apparent from the following detailed description made with reference to the accompanying drawings. In the drawings:

FIG. 7A is a diagram showing a vehicle running cross a center line, FIG. 7B is a diagram showing a rotation direction of a ring portion of a steering wheel, and FIG. 7C is a graph showing a relationship between a rotation amount of the ring portion and time;

FIG. 8A is a diagram showing a vehicle running guided by a navigation apparatus, FIG. 8B is a diagram showing a rotation direction of a ring portion of a steering wheel, and FIG. 8C is a graph showing a relationship between a rotation amount of the ring portion and time;

FIG. 9A is a diagram showing a perpendicular parking guided by the parking support process, FIG. 9B is a diagram showing a rotation direction of a ring portion of a steering wheel, and FIG. 9C is a graph showing a relationship between a rotation amount of the ring portion and time;

FIG. 10A is a diagram showing a perpendicular parking guided by the parking support process, FIG. 10B is a diagram showing a rotation direction of a ring portion of a steering wheel, and FIG. 10C is a graph showing a relationship between a rotation amount of the ring portion and time;

DETAILED DESCRIPTION

The following will describe embodiments of the present disclosure with reference to the drawings. The following is premised that an information providing apparatus according to the present disclosure is used in a left-hand traffic rule used in Japan or Great Britain. Without need to be limited thereto, the information providing apparatus according to the following embodiments can be used in a right-hand traffic rule used in the United States of America. In such a case, only the relation between the right and the left is reversed.

(First Embodiment)

An information providing system 1, which includes an information providing apparatus 5 according to the present embodiment, will be described with reference to FIG. 1.

Figure 1:
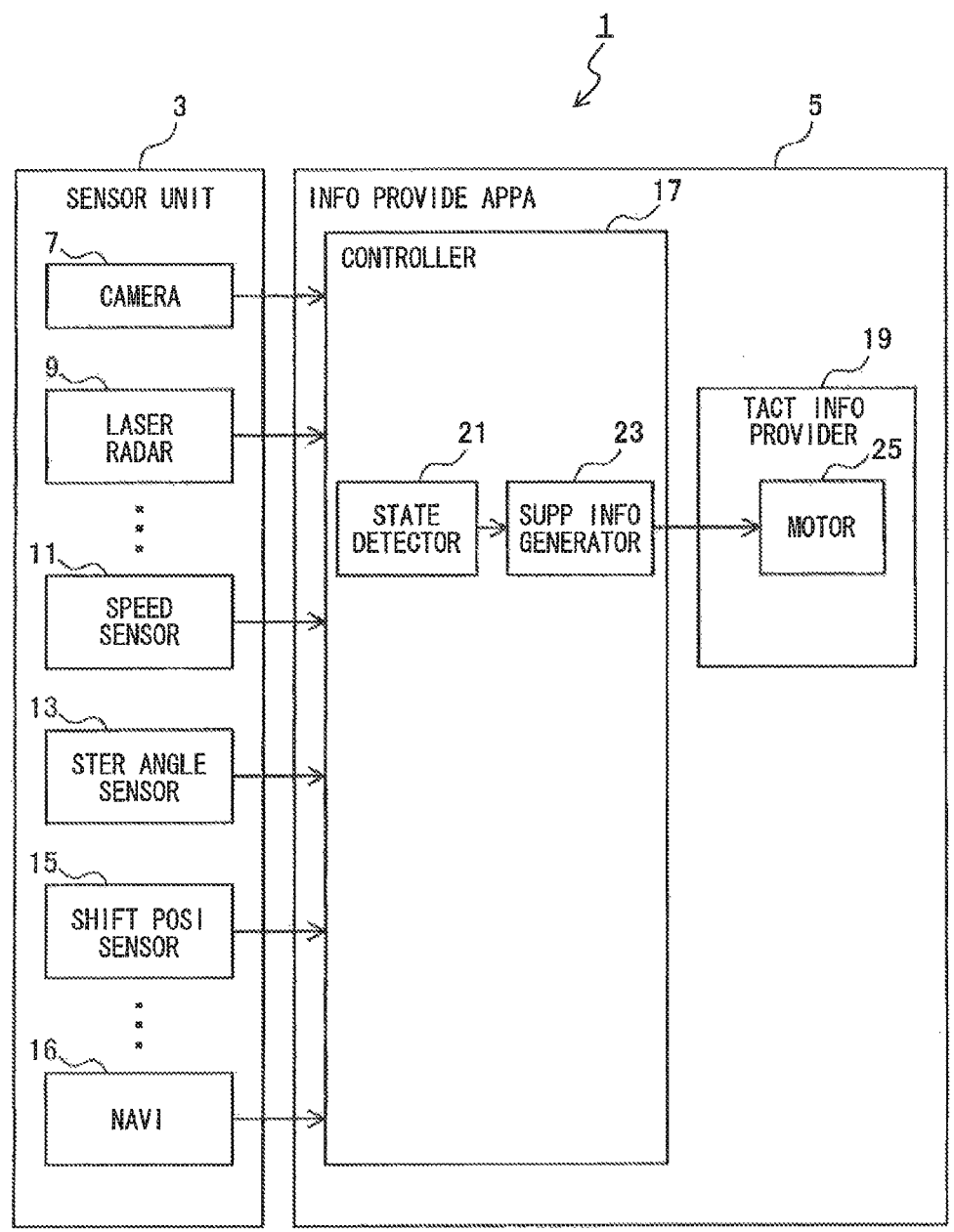
FIG. 1 is a block diagram showing a configuration of an information providing system including an information providing apparatus according to a first embodiment of the present disclosure.

As shown in FIG. 1, the information providing system 1 includes a sensor unit 3 and the information providing apparatus (INFO PROVIDE APPA) 5. Hereinafter, a vehicle to which the information providing apparatus 5 is equipped is referred to as a subject vehicle. The sensor unit 3 includes various sensors, which detect a surrounding state of the subject vehicle and a state of the subject vehicle. The various sensors may be equipped inside the subject vehicle or outside the subject vehicle. The information providing apparatus 5 provides necessary support information to a driver of the subject vehicle. The support information is selected from information detected by the sensor unit 3. Herein, the support information is defined as information that supports a driver of the subject vehicle so that the driver properly drives the subject vehicle. For example, the support information may include a target steering direction of a steering wheel, and a dangerous driving state of the subject vehicle.

The sensor unit 3 may include a camera 7, a laser radar 9, a speed sensor 11, a steering angle sensor (STER ANGLE SENSOR) 13, a shift position sensor (SHIFT POSI SENSOR) 15, and a navigation device (NAVI) 16. The camera 7 takes an image of the surrounding state of the subject vehicle. The laser radar 9 detects a position and a speed of a forward vehicle. Herein, the forward vehicle is defined as a vehicle which is running forward with respect to the subject vehicle. The speed sensor 11 detects a speed of the subject vehicle. The steering angle sensor 13 detects a steering angle of the subject vehicle. The shift position sensor 15 detects a shift position of the subject vehicle.

The information providing apparatus 5 includes a controller 17 and a tactile information provider (TACT INFO PROVIDER) 19. The controller 17 includes a state detector 21 and a support information generator (SUPP INFO GENERATOR) 23. The state detector 21 detects the surrounding state of the subject vehicle and the state of the subject vehicle based on signals transmitted from the sensor unit 3. The support information generator 23 generates the support information based on information detected by the state detector 21. The controller 17 is a well-known computer system, which includes a central processing unit (CPU), a random access memory (RAM), a read-only memory (ROM), an input/output interface (I/O), and a bus line.

The tactile information provider 19 includes a motor 25, which is controlled by the controller 17 based on the support information generated by the support information generator 23. When the motor 25 is controlled to operate by the controller 17, the tactile information provider 19 is activated.

Figure 2:
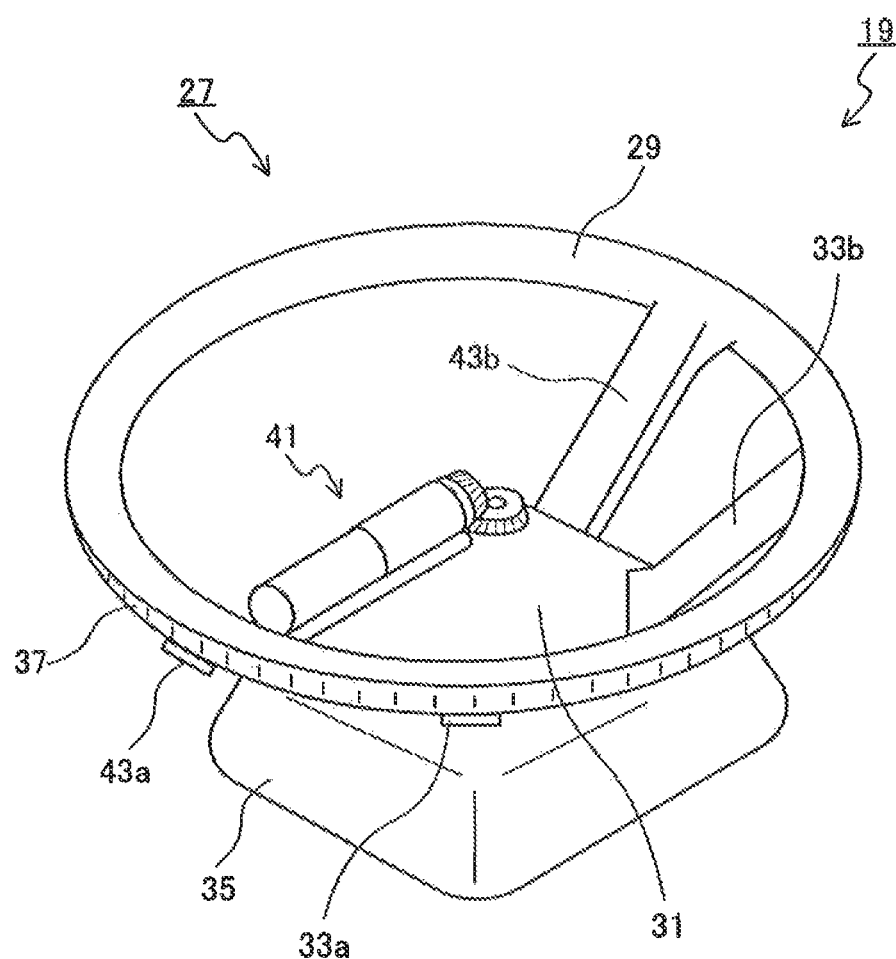
FIG. 2 is a perspective view showing a steering wheel, which is equipped with the information providing apparatus.

The following will describe a configuration of the tactile information provider 19 with reference to FIG. 2 to FIG. 4.

As shown in FIG. 2, the tactile information provider 19 is integrally arranged with a steering wheel 27 of the subject vehicle. The tactile information provider 19 transmits the support information to the driver. The tactile information provider 19 includes a moving part, which contacts with at least one hand of the driver. Hereinafter, the at least one hand is referred to as the hand. Specifically, the tactile information provider 19 controls the moving part to move in a predetermined manner so that predetermined support information is transmitted to the driver via the hand of the driver. Specifically, the hand of the driver is irritated by the moving part when the tactile information provider 19 controls the moving part to move.

The steering wheel 27 is an apparatus for controlling the subject vehicle in a predetermined direction or in a predetermined manner. That is, the steering wheel 27 steers the subject vehicle in the predetermined direction or in the predetermined manner. The driver of the subject vehicle manipulates the steering wheel 27 to drive the subject vehicle. The steering wheel 27 includes a ring-shaped rim portion 29, a plate-shaped base portion 31, a pair of spoke elements 33*a*, 33*b*. The rim portion 29 is hold by the driver and is manipulated to rotate in a circumferential direction by the driver. Thus, the rim portion 29 is also referred to as a holding portion. The base portion 31 is arranged at a center of the steering wheel 27. The pair of spoke elements 33*a*, 33*b* connects the base portion 31 and the rim portion 29.

The steering wheel 27 is rotatably arranged with a steering shaft (not shown). The steering shaft extends from a dashboard 35, which is a part of an instrument panel, and couples to a center of the base portion 31 of the steering wheel 27.

Figure 3A:
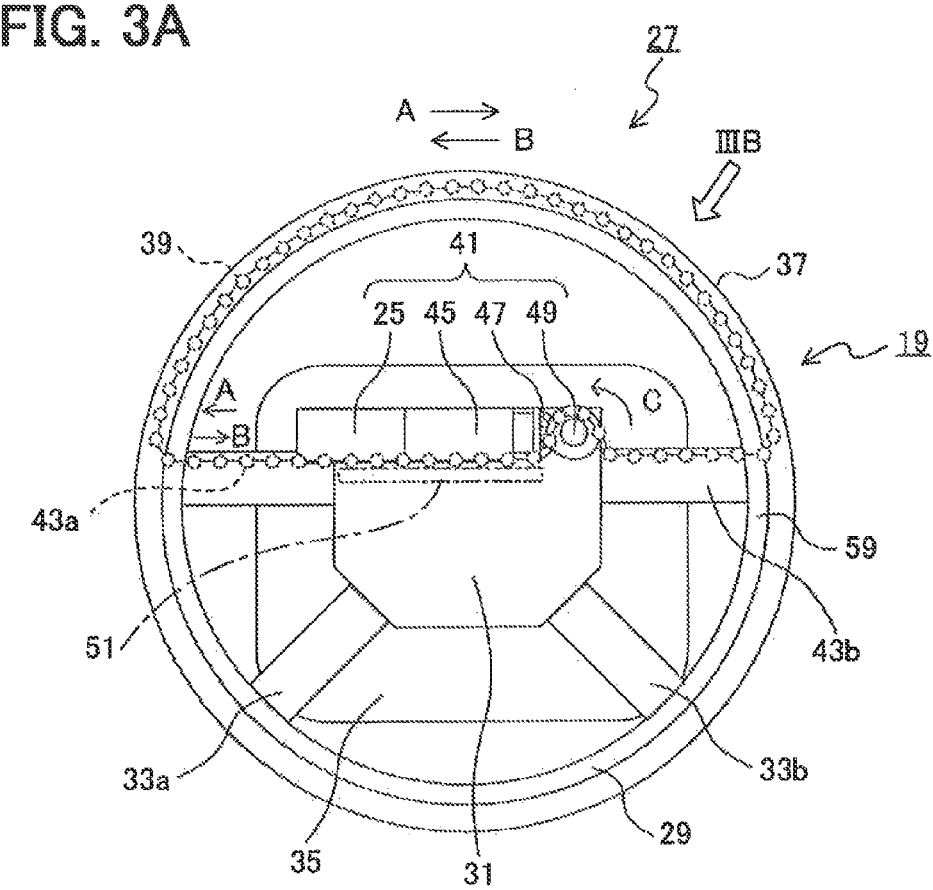
FIG. 3A is a plan view showing the information providing apparatus.

As shown in FIG. 3A, the tactile information provider 19 includes a ring portion 37, a ball chain 39, a driving portion 41, and a pair of guide spoke elements 43*a*, 43*b*. The ring portion 37 is arranged within the rim portion 29 such that the ring portion 37 rotates in a circumferential direction of the rim portion 29. The ball chain 39 is controlled to move by the driving portion 41 in order to rotate the ring portion 37. The pair of guide spoke elements 43a, 43b guides the ball chain 39 toward the rim portion 29.

Specifically, the pair of guide spoke elements 43a, 43b extends from the base portion 31 toward the rim portion 29. The guide spoke elements 43a, 43b respectively extend in opposite directions when viewed on a plane on which the rim portion 29 is arranged. Each guide spoke element 43a, 43b connects the base portion 31 with the rim portion 29 and guides the ball chain 39. Specifically, the ball chain 39 moves through internal portions of the guide spoke elements 43a, 43b. Further, the pair of guide spoke elements 43a, 43b is separately arranged from the pair of spoke elements 33a, 33b.

The ball chain 39 is a close ended chain including multiple balls. A first part of the ball chain 39 is arranged in a predetermined internal portion of the rim portion 29, and a second part of the ball chain 39 is arranged in the internal portions of the guide spoke elements 43a, 43b. Further, a third part of the ball chain 39, which corresponds to a remaining part of the ball chain 39, is arranged along one side of the base portion 31. The predetermined internal portion of the rim portion 29 where the first part of the ball chain 39 is arranged may occupy half of an entire internal portion of the rim portion 29. Since the rim portion 29 has a ring shape, the predetermined internal portion of the rim portion 29 has an approximate semiarch shape. A predetermined part of the rim portion 29, which corresponds to the predetermined internal portion and has a semicircle shape, connects to the guide spoke elements 43a, 43b. A part other than the predetermined part of the rim portion 29 connects to the spoke elements 33a, 33b.

Figure 3B:
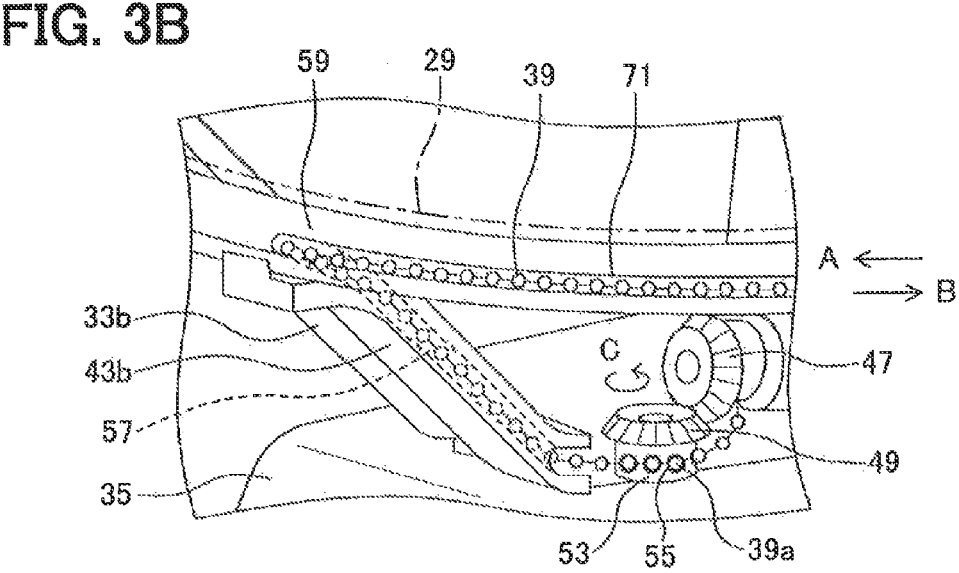
FIG. 3B is a perspective view showing a driving portion of the information providing apparatus in a direction shown by an arrow IIIB in FIG. 3A.

The driving portion 41 is coupled to the base portion 31 along the one side of the base portion 31. As shown in FIG. 3A and FIG. 3B, the driving portion controls the ball chain 39 to move in a direction shown by an arrow A, which corresponds to a clockwise direction, or in a direction shown by an arrow B, which corresponds to a counter-clockwise direction. Hereinafter, the direction shown by the arrow A and the direction shown by the arrow B are also referred to as a direction A and a direction B, respectively. The driving portion 41 includes the motor 25, a gear reducer 45, a first bevel gear 47, and a second bevel gear 49. The motor 25 moves the ring portion 37 via the gear reducer 45, the first bevel gear 47, and the second bevel gear 49 in order to provide the support information to the driver. The gear reducer 45 reduces a rotational speed of the motor 25. The gear reducer 45 drives the first bevel gear 47 to rotate about a first rotation axis, which is parallel to the base portion 31. The second bevel gear 49 engages with the first bevel gear 47 and rotates about a second rotation axis 53, which is perpendicular to the base portion 31.

The tactile information provider 19 further includes a guide pipe 51 arranged along the motor 25 and the gear reducer 45. The guide pipe 51 guides the ball chain 39 to move along the motor 25 and the gear reducer 45. Further, as shown in FIG. 3B, the second rotation axis 53 of the second bevel gear 49 has a cylindrical shape. The second rotation axis 53 has hemisphere-shaped recessed portions 55 on a surface of the second rotation axis 53 so that a predetermined number of balls 39a of the ball chain 39 fit in the recessed portions 55.

As shown in FIG. 3B, the predetermined number of the balls 39a of the ball chain 39 respectively fit in the recessed portions 55 of the second rotation axis 53 so that the ball chain 39 is wound on the second rotation axis 53. Further, the second part of the ball chain 39 is arranged in the straight internal portions of the guide spoke elements 43a, 43b. The internal portions of the pair of guide spoke elements 43a, 43b respectively have pipe shapes and provide a pair of first guide paths 57 for the ball chain 39. Further, the first part of the ball chain 39 is arranged in the predetermined internal portion of the rim portion 29.

Figure 4A:
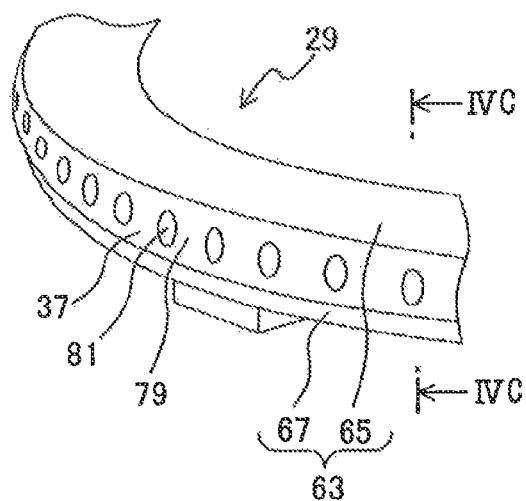
FIG. 4A is a perspective view showing a rim portion of a steering wheel.
Figure 4C:
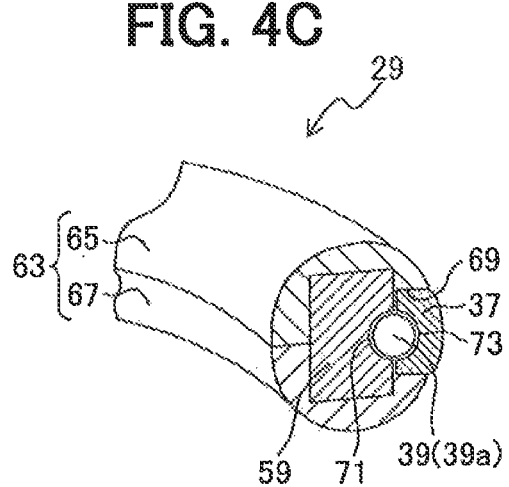
FIG. 4C is a perspective view showing a cross-section of the rim portion in a line IVC-IVC in FIG. 4A.

As shown in FIG. 4A and FIG. 4C, the rim portion 29 includes a core metal 59 and a cover unit 63. The cover unit 63 includes an upper cover element 65 and a lower cover element 67. The upper cover element 65 and the lower cover element 67 are joined together to integrally form the cover unit 63. The core metal 59, which has a ring shape and is made of, for example, aluminum alloy, is fixed to the spoke elements 33a, 33b. The ring portion 37 of the tactile information provider 19 is arranged adjacent to a radially external surface of the core metal 59. Specifically, a radially internal surface of the ring portion 37 is arranged adjacent to the radially external surface of the core metal 59. The ring portion 37, which has a ring shape and is made of, for example, rigid plastic, is rotatable with respect to the core metal 59. The cover unit 63, which is made of urethane, seals the core metal 59 and the ring portion 37 in the circumferential direction of the rim portion 29 so that only a radially external surface of the ring portion 37 is exposed to an outside of the rim portion 29.

The radially external surface of the rim portion 29 defines a ring-shaped trench 69. Specifically, the trench 69 is defined by a bottom surface of the upper cover element 65, a top surface of the lower cover element 67, and the radially external surface of the core metal 59. The trench 69 has an approximately U-shaped cross section and the ring portion 37 is rotatably fit in the trench 69.

Figure 4B:
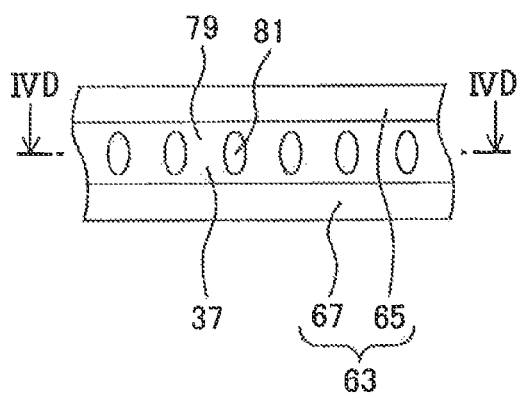
FIG. 4B is a side view showing the rim portion of the steering wheel.
Figure 4D:
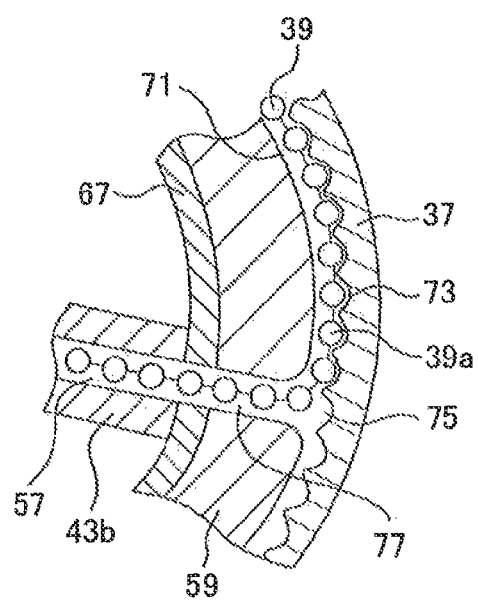
FIG. 4D is a cross-sectional view showing the rim portion in a line IVD-IVD in FIG. 4B.

As shown in FIG. 4C and FIG. 4D, a trench 71 is formed on the radially external surface of the core metal 59 in the circumferential direction of the rim portion 29 so that the ball chain 39 slides along the trench 71. The trench 71 has a relatively small width compared with the trench 69 formed on the radially external surface of the rim portion. The trench 71 has a semicircle-shaped cross section. Further, multiple recessed portions 73 having hemisphere-shapes are formed at even intervals on the radially internal surface of the ring portion 37. Each ball of the ball chain 39 fits in each recessed portion 73. The trench 71 and the recessed portions 73 provide a ring-shaped internal space in the rim portion 29. The internal space corresponds to the predetermined internal portion of the rim portion 29 and provides a second guide path 75. The trench 71 formed on the core metal 59 is only formed in the predetermined internal portion of the rim portion 29.

Further, a pair of dividing guide paths 77 is arranged between the pair of first guide paths 57 and the second guide path 75. Each dividing guide path 77 penetrates the core metal 59, the cover unit 63 such that each dividing guide path 77 extends in a radially internal direction of the rim portion 29. With this configuration, the pair of first guide paths 57 is communicated with the second guide path 75. Thus, the ball chain 39 is guided from the first guide path 57 to the second guide path 75 through the dividing guide path 77.

As shown in FIG. 4B, the ring portion 37 has recessed portions 79 and protruded portions 81, which are arranged repeatedly at intervals on a radially external surface of the ring portion 37 in the circumferential direction. Hereinafter, all the recessed portions 79 are also referred to as a recessed part, and all the protruded portions 71 are also referred to as a protruded part. When the recessed portions 79 and the protruded portions 81 contact with the hand of the driver, the hand is irritated by the recessed portions 79 and the protruded portions 81.

The following will describe an operation of the tactile information provider 19 with reference to drawings.

As shown in FIG. 3A and FIG. 3B, when the controller 17 operates the motor 25, the tactile information provider 19 is activated. Specifically, the controller 17 controls the motor 25 to rotate in a predetermined direction. The predetermined direction is defined as a direction to which the steering wheel 27 is expected to be manipulated. The gear reducer 45 reduces a rotational speed of the motor 25 and drives the first bevel gear 47 to rotate. When the first bevel gear 47 starts to rotate, the second bevel gear 49 is driven to rotate by the first bevel gear 47.

As shown in FIG. 3B, for example, when the second bevel gear 49 rotates in a direction shown by an arrow C (hereinafter, the direction shown by the arrow C is also referred to as a direction C), the second rotation axis 53 of the second bevel gear 49 rotates in the direction C. Thus, the balls 39a fit in the recessed portions 55 of the second rotation axis 53 move in the direction C.

When the balls 39a fit in the recessed portions 55 of the second rotation axis 53 move, the ball chain 39 moves from the guide spoke element 43b to the guide spoke element 43a. That is, the ball chain 39 moves in the direction A.

As shown in FIG. 4C and FIG. 4D, the balls 39a of the ball chain 39 fit in the recessed portions 73 of the ring portion 37. That is, each ball 39a and each recessed portion 73 engage with each other and move together. Thus, when the ball chain 39 moves in the direction A, the ring portion 37 moves together with the ball chain 39 in the direction A. That is, the ring portion 37 moves in the clockwise direction.

With above-described configuration, the ring portion 37 provides the support information to the driver via the hand, which holds the ring portion 37. Herein, the support information signifies a rotation of the ring portion 37 in the clockwise direction.

Figure 5:
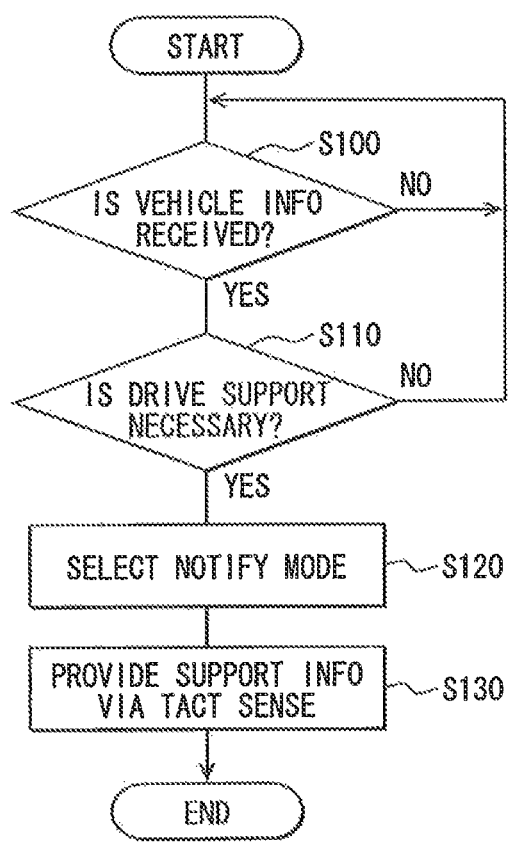
FIG. 5 is a flowchart showing a warning process executed by the information providing apparatus according to the first embodiment.
Figure 6A:
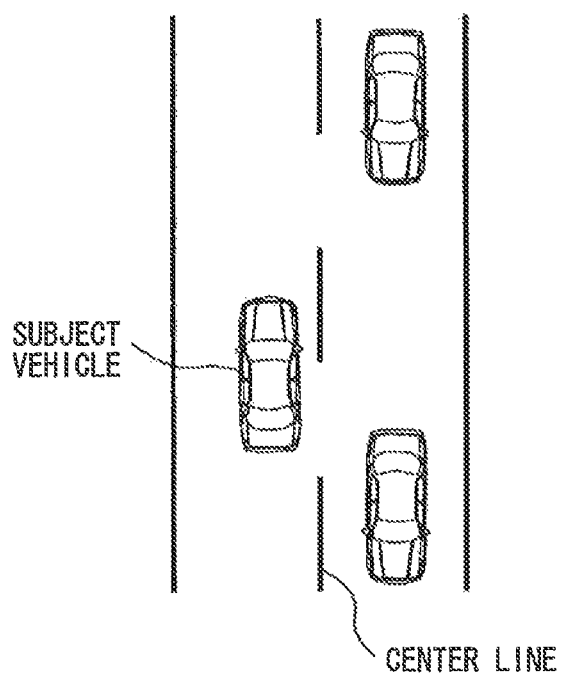
FIG. 6A is a diagram showing a vehicle running near a center line.
Figure 6B:
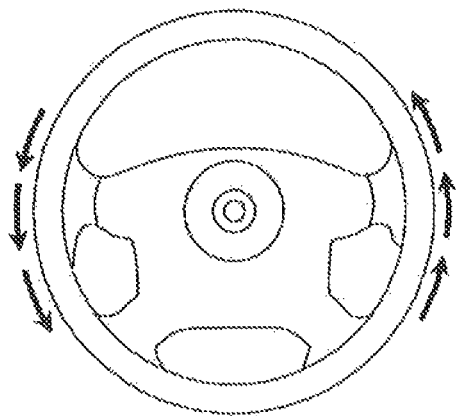
FIG. 6B is a diagram showing a rotation direction of a ring portion of the steering wheel.
Figure 6C:
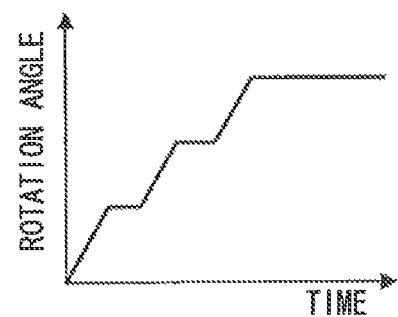
FIG. 6C is a graph showing a relationship between a rotation amount of the ring portion and time.

The following will describe a control process executed by the controller 17 of the information providing apparatus 5 for providing the support information to the driver with reference to FIG. 5 to FIG. 6C.

The control process according to the present embodiment is executed by the controller 17 in a case where the subject vehicle departs from a traffic lane during a running. Specifically, the control process is executed when the subject vehicle runs near a center line. When the subject vehicle runs near the center line, the tactile information provider 19 transmits the support information to the driver via the steering wheel 27. The tactile information provider 19 transmits the support information to the driver by notifying a steering direction of the steering wheel 27 and providing a warning to the driver.

As shown in FIG. 5, when the control process starts, at S100, the controller 17 determines whether information related to the surrounding state and the vehicle state of the subject vehicle is received from the sensor unit 3. Hereinafter, the information related to the surrounding state and the vehicle state of the subject vehicle is also referred to as vehicle related information. For example, the controller 17 determines whether an image, which includes a road surface and is taken by the camera 7, is received from the sensor unit 3. When the controller 17 determines that the vehicle related information is received from the sensor unit 3 (S100: YES), the controller 17 proceeds to S110. When the controller 17 determines that the vehicle related information is not received from the sensor unit 3 (S100: NO), the controller 17 stands by at S100.

At S110, the controller 17 determines whether a driving support is necessary. For example, the controller 17 determines whether the subject vehicle is running extremely near the center line. Further, the controller 17 determines whether the driver should be notified of that the vehicle is running extremely near the center line. When the controller 17 determines that the driving support is necessary (S110: YES), the controller 17 proceeds to S120. When the controller 17 determines that the driving support is not necessary (S110: NO), the controller 17 returns to S100, At S120, the controller 17 selects a notify mode of the support information to the driver. In the present embodiment, the notify mode is selected to a tactile notify mode. The tactile notify mode includes a tactile rotation mode and a tactile vibration mode. In the tactile rotation mode, the ring portion 37 may rotate in an intermittent manner or in a continuous manner. Hereinafter, the tactile rotation in the intermittent manner is also referred to as an intermittent rotation mode, and the tactile rotation in the continuous manner is also referred to as a continuous rotation mode. For example, as shown in FIG. 6A, when the subject vehicle runs extremely near the center line, the driver needs to be notified that a running position of the subject vehicle. Then, the controller 17 selects one of the tactile rotation mode and the vibration mode in order to provide the support information to the driver of the subject vehicle.

As described above, when the subject vehicle runs extremely near the center line on a two-lane road, the driver needs to be guided to drive the vehicle toward an end side of a subject traffic lane so that the vehicle runs apart from the center line. Herein, the subject traffic lane is a traffic lane within which the subject vehicle runs. In FIG. 6A, the end side of the subject traffic lane corresponds to a left side of the subject vehicle. Thus, support information for guiding the driver to manipulate the steering wheel 27 in a corresponding direction needs to be selected and transmitted to the driver. In this case, the corresponding direction is the counter-clockwise direction of the steering wheel 27.

Specifically, as shown in FIG. 6B, the controller 17 selects the tactile rotation mode to notify the support information to the driver by rotating the ring portion 37 in the counter-clockwise direction. More specifically, as shown in FIG. 6C, the controller 17 selects the tactile rotation mode to notify the support information to the driver by rotating the ring portion 37 in the counter-clockwise direction in the intermittent manner. In the intermittent manner, the ring portion 37 intermittently rotates such that the ring portion 37 periodically stops rotating after rotating a predetermined rotation amount for a predetermined time. In FIG. 6C, a vertical axis of the graph indicates the rotation amount of the ring portion 37. The rotation amount is a rotated angle of the ring portion 37 from an original position to a present position. The rotated angle increases in a direction of an arrow of the vertical axis.

At S130, the controller 17 controls the tactile information provider 19 to provide the support information determined at S120. Specifically, the controller 17 controls the motor 25 to drive the ring portion 37 such that the ring portion 37 intermittently rotate in the counter-clockwise direction. The rotation of the ring portion 37 guides the driver to manipulate the steering wheel 27 in the counter-clockwise direction. Then, the control process is ended.

As described above, in the present embodiment, the ring portion 37, which is hold by the hand of the driver, fits in the trench 69, which is circumferentially formed in the rim portion 29 of the steering wheel 27. The ring portion 37 is rotatable in the circumferential direction of the rim portion 29 when driven by the driving portion 41. Thus, the rotation of the ring portion 37, which is driven by the driving portion 41, irritates the hand of the driver. With this configuration, the support information is easily and reliably transmitted to the driver. Herein, the support information includes a predetermined rotation direction of the steering wheel 27 to be steered and a warning to steer the steering wheel 27 in the predetermined rotation direction.

In the present embodiment, the support information to be transmitted to the driver includes the rotation direction and the rotation amount of the steering wheel 27. Further, the support information is transmitted to the driver via the tactile sense. The tactile sense is a sense felt by the driver by touching an object. For example, when the driver holds the ring portion 37, which is arranged within the steering wheel 27, with hand, the tactile sense of the ring portion 37 is transmitted to the driver. The support information is provided to the driver via the tactile sense of the hand when the driver holds the ring portion 37. Since, the tactile sense is less likely to be explained in various ways, the support information is reliably transmitted to the driver in an easy-to-understand manner.

As described above, the ring portion 37 is arranged along the rim portion 29 and rotates in the circumferential direction. Thus, an information providing region is enlarged with a simple configuration and a low cost. Herein, the information providing region is defined as a region which contacts with the hand, specifically, a palm of the hand and provides the support information to the driver via the tactile sense. In the present embodiment, the information providing region corresponds to a region where the tactile information provider 19 is arranged. Further, a simple configuration of the tactile information provider 19 achieves a low-cost in manufacturing.

In the present embodiment, the ring portion 37 is arranged adjacent to the rim portion 29 in the radially external side. With this configuration, when the driver holds the rim portion 29, the ring portion 37 is less likely to be extremely pressed by the hand of the driver. Thus, the ring portion 37 easily rotates in the circumferential direction thereby easily irritating the hand of the driver during the driving.

In the present embodiment, the ring portion 37 has the recessed portions 79 and the protruded portions 81 on the radially external surface. With this configuration, the hand of the driver is more easily irritated by the ring portion 37.

In the present embodiment, the control process is executed when the subject vehicle runs near the center line. Further, on a road having more than one traffic lanes in one direction, when the subject vehicle runs near a division line, which is set between two traffic lanes, the tactile information provider 19 may provide the support information to the driver. Further, when the subject vehicle runs near an end line near a sidewalk or runs near a guardrail, the tactile information provider 19 may provide the support information to the driver.

(Second Embodiment)

The following will describe a control process executed by the controller 17 of the information providing apparatus 5 according to a second embodiment. The following description will omit the configuration, which is the same with the information providing apparatus 5 according to the first embodiment.

In the present embodiment, the configuration of the information providing apparatus 5 is similar to the information providing apparatus 5 according to the first embodiment. A control process executed by the controller 17 in the present embodiment is different from the control process executed in the first embodiment. The following will describe the control process executed by the controller 17 in the present embodiment with reference to FIG. 7A to FIG. 7C, In the drawings, the same or equivalent part has the same reference number.

The control process according to the present embodiment is executed by the controller 17 in a case where the subject vehicle departs from a traffic lane during a running. Specifically, the control process is executed when the subject vehicle departures a subject traffic lane and crosses a center line. Herein, the subject traffic lane is an original traffic line within which the subject vehicle runs. When the subject vehicle crosses the center line, the tactile information provider 19 transmits support information to the driver via the steering wheel 27. In this case, the support information is a warning, which indicates that the subject vehicle crossed the center line.

Figure 7A:
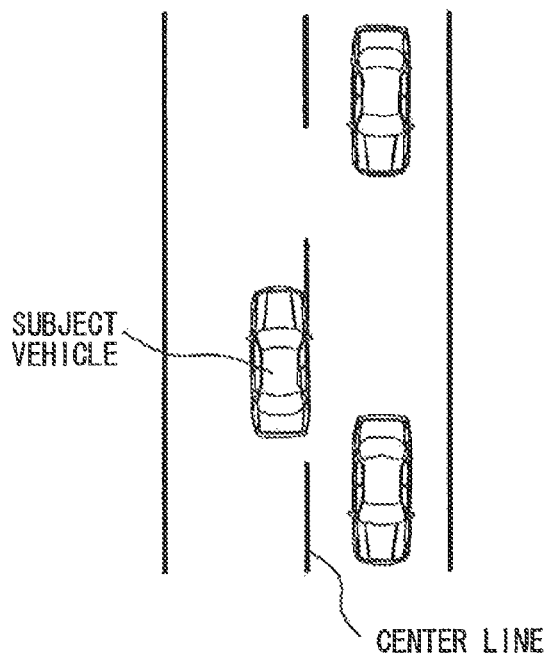
FIG. 7A to FIG. 7C are diagrams showing a warning process executed by an information providing apparatus according to a second embodiment.
Figure 7B:
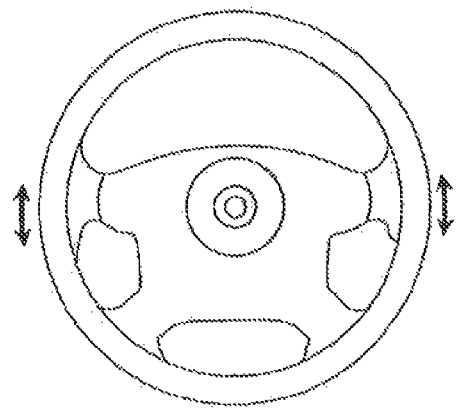
Figure 7C:
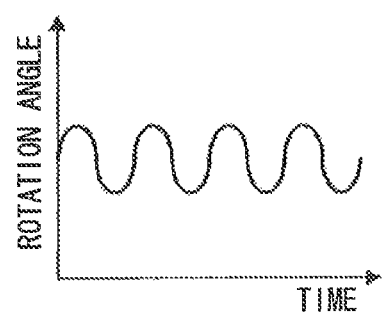

As shown in FIG. 7A, when the subject vehicle crosses the center line, the tactile information provider 19 intensively warns the driver that the subject vehicle crossed the center line. Specifically, as shown in FIG. 7B and FIG. 7C, the controller 17 selects the tactile vibration mode to control the tactile information provider 19 rapidly vibrate in opposite directions along the circumferential direction of the rim portion 29. A vibration frequency of the tactile information provider 19 may be set to 10 Hz.

The information providing apparatus 5 according to the present embodiment provides advantages similar to the advantages described in the first embodiment. In the present embodiment, the information providing apparatus 5 intensively warns the driver by a vibration of the ring portion 37 when the subject vehicle crosses the center line. Further, the information providing apparatus 5 may also notify a predetermined rotation direction of the steering wheel 27 by selecting the tactile rotation mode so that the ring portion 37 rotates in the intermittent manner or in the continuous manner. Herein, the predetermined rotation direction is a direction to which the subject vehicle needs to be driven so that the subject vehicle returns within the subject traffic lane.

In the present embodiment, the control process is executed to warn the driver of the subject vehicle when the subject vehicle crosses the center line. Further, on a road having more than one traffic lanes, when the subject vehicle crosses the division line, the tactile information provider 19 may warn the driver. Further, when the subject vehicle crosses the end line near the sidewalk or runs near the guardrail, the tactile information provider 19 may also warn the driver.

(Third Embodiment)

The following will describe a control process executed by the controller 17 of the information providing apparatus 5 according to a third embodiment. The following description will omit the configuration, which is the same with the information providing apparatus 5 according to the first embodiment.

In the present embodiment, the configuration of the information providing apparatus 5 is similar to the information providing apparatus 5 according to the first embodiment. A control process executed by the controller 17 in the present embodiment is different from the control process executed in the first embodiment. The following will describe the control process executed by the controller 17 in the present embodiment with reference to FIG. 8A to FIG. 8C.

The control process according to the present embodiment is executed by the controller 17 in a case where the subject vehicle is being guided by a navigation device. Specifically, when the subject vehicle is being guided by the navigation device to run a guide route, the information providing apparatus 5 may provide support information via the steering wheel 27. In this case, the support information is a traveling direction guided by the navigation device.

Figure 8A:
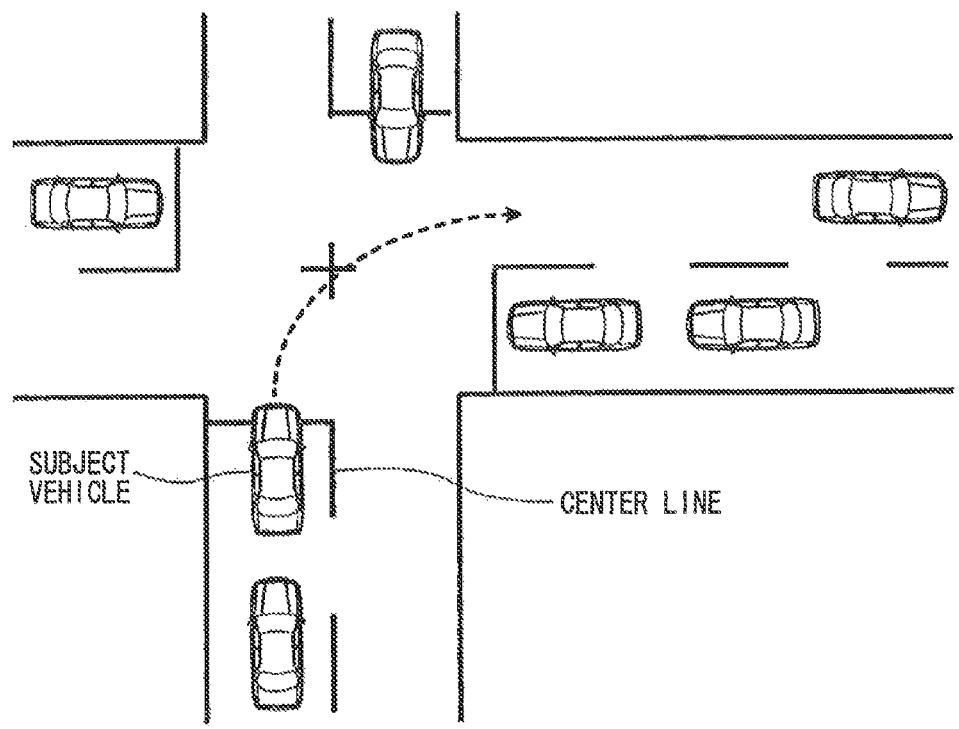
FIG. 8A to FIG. 8C are diagrams showing a control process executed by an information providing apparatus according to a third embodiment.
Figure 8B:
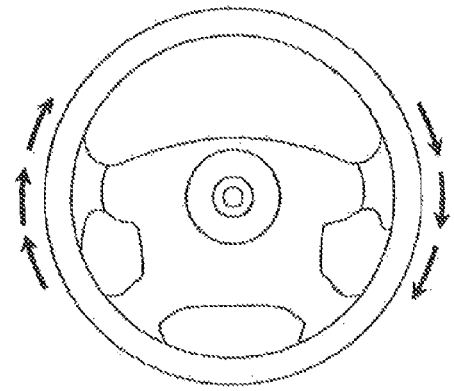
Figure 8C:
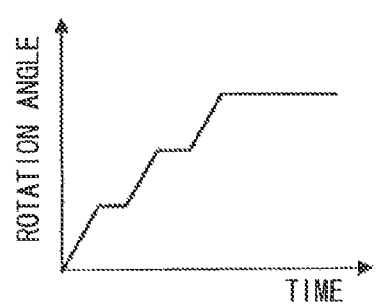

As shown in FIG. 8A, when the subject vehicle is guided to turn right at an intersection, the controller 17 selects the tactile rotation mode to rotate the ring portion 37 in the clockwise direction in the intermittent manner as shown in FIG. 8B and FIG. 8C.

The information providing apparatus 5 according to the present embodiment provides advantages similar to the advantages described in the first embodiment. Further, the traveling direction is reliably provided to the driver of the subject vehicle by rotating the ring portion 37. In the present embodiment, the ring portion 37 rotates in the intermittent manner. Further, the ring portion 37 may rotate in the continuous manner.

(Fourth Embodiment)

The following will describe a control process executed by the controller 17 of the information providing apparatus 5 according to a fourth embodiment. The following description will omit the configuration, which is the same with the information providing apparatus 5 according to the first embodiment.

Figure 9A:
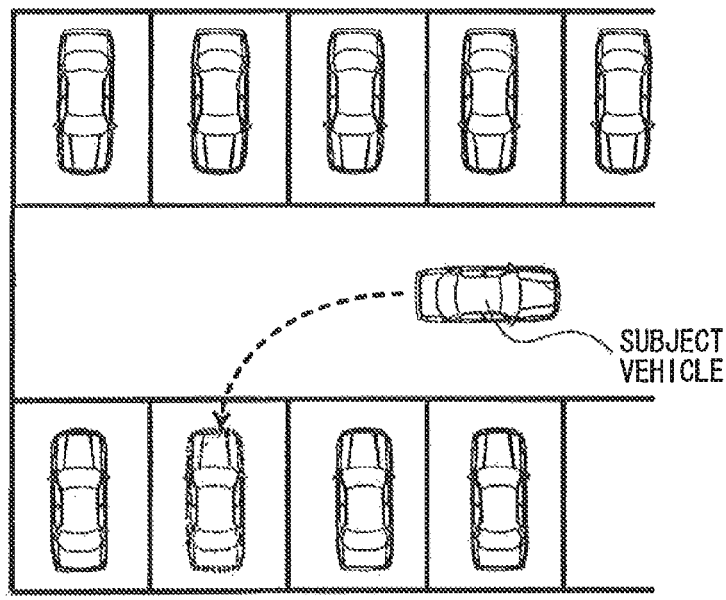
FIG. 9A to FIG. 9C are diagrams showing a parking support process executed by an information providing apparatus according to a fourth embodiment.

In the present embodiment, the configuration of the information providing apparatus 5 is similar to the information providing apparatus 5 according to the first embodiment. A control process executed by the controller 17 in the present embodiment is different from the control process executed in the first embodiment. The following will describe the control process executed by the controller 17 in the present embodiment with reference to FIG. 9A to FIG. 9C.

The control process according to the present embodiment is executed by the controller 17 in a case of parking the subject vehicle as disclosed in JP-A-2006-007875 (corresponding to U.S. Pat. No. 6,999,003 B2). Specifically, during a perpendicular parking of the subject vehicle, support information is provided to the driver via the steering wheel 27. Herein, the perpendicular parking means a parking manner in which the vehicles are parked side to side such that the vehicles are perpendicular to an aisle, a curb, or a wall. In this case, the support information is a predetermined rotation direction of the steering wheel 27.

Figure 9B:
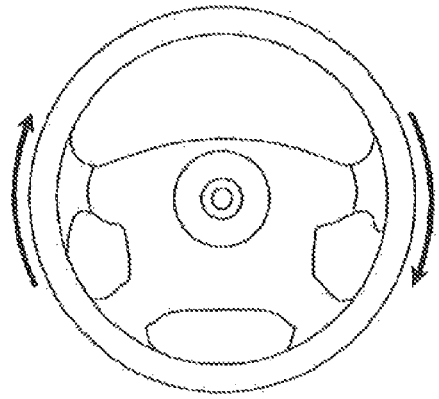
Figure 9C:
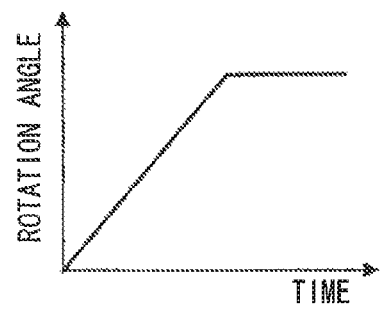

During the perpendicular parking, when the driver parks the subject vehicle in a single-turn manner, the controller 17 selects the tactile rotation mode to rotate the ring portion 37 in the continuous manner so that the support information is provided to the driver. Herein, the single-turn manner is defined as a parking manner that permits a single turn of the steering wheel 27 in order to park the subject vehicle at a target parking position. For example, in a case shown in FIG. 9A, the ring portion 37 rotates in the clockwise direction in the continuous manner as shown in FIG. 9B and FIG. 9C in order to guide the driver to park the subject vehicle at the target parking position based on the support information.

Specifically, in order to provide the support information for a time period, during which the support information is necessary, the controller 17 selects the tactile rotation mode to rotate the ring portion 37 in the continuous manner. Specifically, during the time period, the ring portion 37 notifies the support information to the driver based on a control amount, which is calculated to support the parking of the subject vehicle at the target parking position. The control amount includes a target steering direction and a target steering angle of the steering wheel 27. The target steering direction indicates a direction to which the subject vehicle to be driven, and the target steering angle indicates an angel by which the steering wheel to be steered. As described above, the target steering direction and the target steering angle of the control amount are calculated for parking the subject vehicle at the target parking position.

The information providing apparatus 5 according to the present embodiment provides advantages similar to the advantages described in the first embodiment. Further, the target steering direction and the target steering angle of the steering wheel 27 are reliably notified to the driver. In the present embodiment, when the ring portion 37 rotates based on the control amount, the driver only needs to rotate the steering wheel 27 in the same rotation direction with the ring portion 37. Thus, the driver can easily park the subject vehicle assisted by the support information, which is provided by the information providing apparatus 5.

In the present embodiment, during the time period, the ring portion 37 rotates in the continuous manner. Further, the ring portion 37 may rotate in the intermittent manner during the time period.

(Fifth Embodiment)

The following will describe a control process executed by the controller 17 of the information providing apparatus 5 according to a fifth embodiment. The following description will omit the configuration, which is the same with the information providing apparatus 5 according to the first embodiment.

Figure 10A:
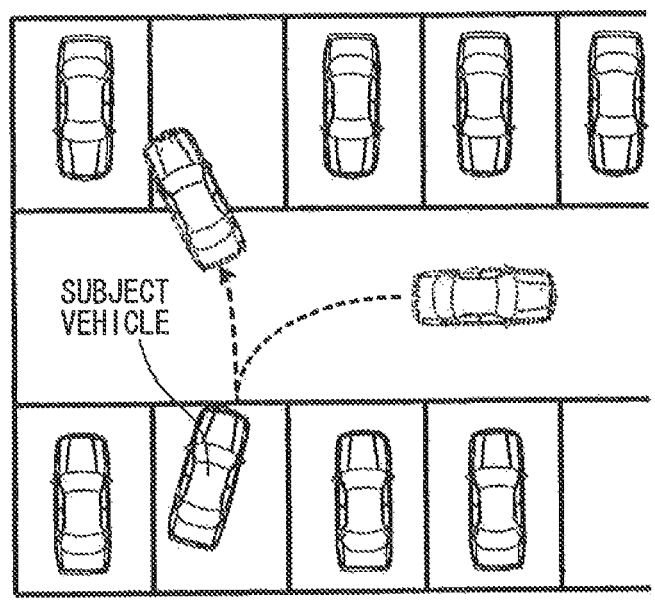
FIG. 10A to FIG. 10C are diagrams showing a parking support process executed by an information providing apparatus according to a fifth embodiment.

In the present embodiment, the configuration of the information providing apparatus 5 is similar to the information providing apparatus 5 according to the first embodiment. A control process executed by the controller 17 in the present embodiment is different from the control process executed in the first embodiment. The following will describe the control process executed by the controller 17 in the present embodiment with reference to FIG. 10A to FIG. 10C.

The control process according to the present embodiment is executed by the controller 17 during the perpendicular parking of the subject vehicle. During the perpendicular parking, when the driver parks the subject vehicle in a multiple-turn manner, the controller 17 selects the tactile rotation mode to rotate the ring portion 37 in the intermittent manner so that the support information is provided to the driver. Herein, the support information is a manipulation method of the steering wheel 27. The multiple-turn manner is defined as a parking manner that requires two or more turns of the steering wheel 27 in order to park the subject vehicle at a target parking position, For example, the multiple-turn manner is used when the driver parks the subject vehicle in a restricted area.

Figure 10B:
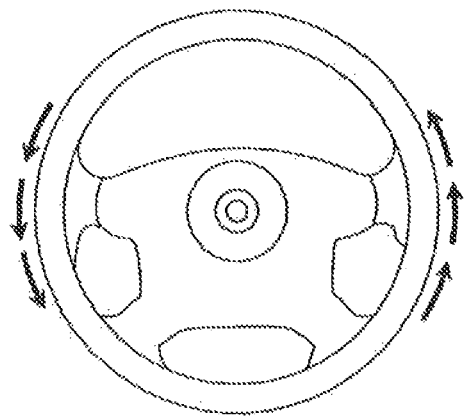
Figure 10C:
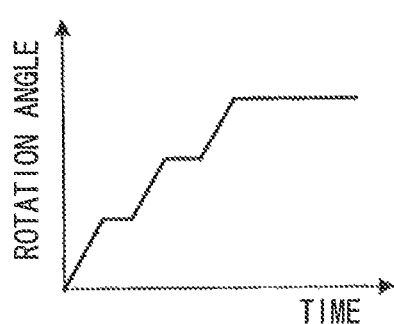

For example, in a case shown in Fig. WA, in order to park the subject vehicle at the target parking position in the multiple-turn manner, the driver first needs to turn the steering wheel 27 in the clockwise direction in order to move backward. Then, the driver needs to switch the rotation direction of the steering wheel 27 in the counter-clockwise direction in order to move forward. At a direction switch time of the steering wheel 27, the controller 17 controls the ring portion 37 to rotate in a target direction in the intermittent manner for a predetermined time period as shown in FIG. 10B and FIG. 10C. In the case shown in FIG. 10A to FIG. 10C, the target direction corresponds to the counter-clockwise direction.

With above-described configuration, the information providing apparatus 5 according to the present embodiment provides advantages similar to the advantages described in the first embodiment. Further, in the present embodiment, the direction switch time of the steering wheel 27 is reliably notified to the driver. In the present embodiment, the driver rotates the steering wheel 27 in the same direction with the ring portion 37 until the direction switch time. When the direction switch time comes, the driver needs to switch the rotation direction of the steering wheel along the target direction provided by the ring portion 37. Thus, the driver can easily park the subject vehicle with the support information provided by the information providing apparatus 5.

In the present embodiment, the ring portion 37 starts to rotate in the intermittent manner from the direction switch time for the predetermined time period. Further, the ring portion 37 may start to rotate in the continuous manner from the direction switch time for the predetermined time period.

(Sixth Embodiment)

The following will describe a control process executed by the controller 17 of the information providing apparatus 5 according to a sixth embodiment. The following description will omit the configuration, which is the same with the information providing apparatus 5 according to the first embodiment.

In the present embodiment, a control process executed by the controller 17 is similar to the control process executed in the first embodiment. A configuration of the information providing apparatus 5 according to the present embodiment is partially different from the configuration of the information providing apparatus 5 according to the first embodiment. The following will describe the configuration of the information providing apparatus 5 according to the present embodiment with reference to FIG. 11.

Figure 11:
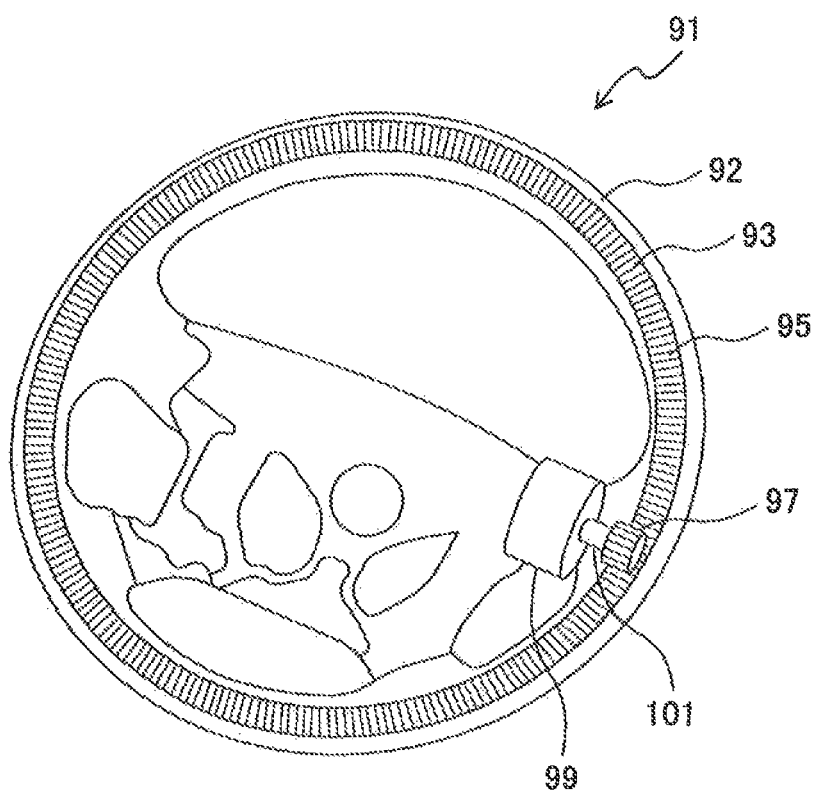
FIG. 11 is a perspective view showing an internal portion of a steering wheel according to a sixth embodiment.

As shown in FIG. 11, a ring portion 93 is arranged in a rim portion 92 of a steering wheel 91 in a similar manner to the ring portion 37 in the first embodiment.

In the present embodiment, a ring-shaped first gear 95 is arranged on an upper surface of the ring portion 93 in a circumferential direction of the ring portion 93. Further, a cylindrical-shaped second gear 97 is arranged in a radial direction of the ring portion 93 such that the second gear 97 engages with the first gear 95. The first gear 95 and the second gear 97 provide a rack and pinion structure. Specifically, the first gear 95 operates as a rack, and the second gear 97 operates as a pinion. The pinion 97 is coupled to a rotation axis 101 of a motor 99, which drives the tactile information provider 19.

When the tactile information provider 19 provides support information to the driver of the subject vehicle, the controller 17 controls the motor 99 so that the motor 99 drives the pinion 97 to rotate. When the pinion 97 rotates, the rack 95 engaged with the pinion 97 is driven by the pinion 97 to rotate in the circumferential direction. Thus, the ring portion 93 is driven by the rack 95, which is arranged on the ring portion 93, to rotate in the circumferential direction.

With above-described configuration, the information providing apparatus 5 according to the present embodiment provides advantages similar to the advantages described in the first embodiment. Further, in the present embodiment, a configuration to rotate the ring portion 93 is simple. Thus, a necessary space for the information providing apparatus 5 can be reduced.

(Seventh Embodiment)

The following will describe a control process executed by the controller 17 of the information providing apparatus 5 according to a seventh embodiment. The following description will omit the configuration, which is the same with the information providing apparatus 5 according to the first embodiment.

In the present embodiment, a control process executed by the controller 17 is the same with the control process executed in the first embodiment. A configuration of the information providing apparatus 5 according to the present embodiment is partially different from the configuration of the information providing apparatus 5 according to the first embodiment. The following will describe the configuration of the information providing apparatus 5 according to the present embodiment with reference to FIG. 12A and FIG. 12B.

Figure 12A:
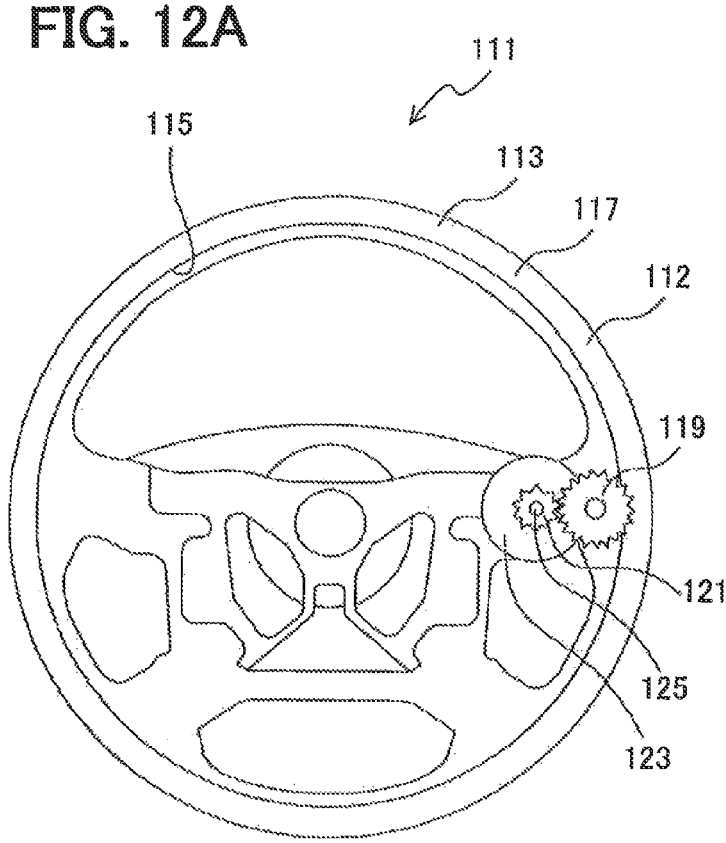
FIG. 12A is a plan view showing an internal portion of a steering wheel according to a seventh embodiment and FIG. 12B is a side view of the steering wheel.

As shown in FIG. 12A, a ring portion 113 is arranged in a rim portion 112 of a steering wheel 111 in a similar manner to the ring portion 37 in the first embodiment.

Figure 12B:
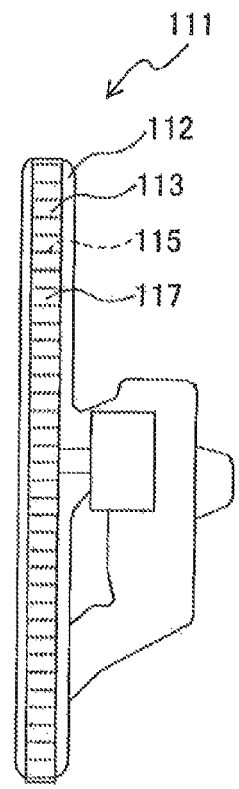

As shown in FIG. 12B, a ring-shaped first gear 115 is arranged on a radially inner surface of the ring portion 113 in a circumferential direction of the ring portion 113. Further, a cylindrical-shaped second gear 119 is arranged in a direction perpendicular to an imaginary plane on which the rim portion 117 is arranged such that the second gear 119 engages with the first gear 115. The first gear 115 and the second gear 119 provide a rack and pinion structure. Specifically, the first gear 115 operates as a rack, and the second gear 119 operates as a pinion. Further, a gear reducer 121 is arranged parallel to the pinion 119 such that the pinion 119 engages with the gear reducer 121. The gear reducer 121 is coupled to a rotation axis 125 of a motor 123.

When the tactile information provider 19 provides support information to the driver of the subject vehicle, the controller 17 controls the motor 123 so that the motor 123 drives the gear reducer 121 to rotate. When the gear reducer 121 rotates, the pinion 119 engaged with the gear reducer 121 is driven to rotate. Thus, the ring portion 113 is driven to rotate in the circumferential direction.

With above-described configuration, the information providing apparatus 5 according to the present embodiment provides advantages similar to the advantages described in the first embodiment. Further, in the present embodiment, a configuration to rotate the ring portion 113 is simple. Thus, a necessary space for the information providing apparatus 5 can be reduced.

(Other Embodiments)

In the forgoing embodiments, when the ring portion rotates in the continuous manner or in the intermittent manner, the ring portion is controlled to rotate at a predetermined speed in a predetermined direction. Further, a rotation speed of the ring portion may be controlled to gradually increase, or change in a non-linear manner. For example, the rotation speed of the ring portion may change in a sine curve manner. Further, the ring portion may be controlled to repetitively vibrate at a high speed in the circumferential direction.

Under a condition that (i) the ring portion is arranged within the steering wheel such that the hand, specifically, the palm of the hand is irritated by the rotation of the ring portion, and (ii) the ring portion is less likely to interrupt the driver to hold the steering wheel, the ring portion may be arranged in a manner other than the manner described in the forgoing embodiments.

Figure 13:
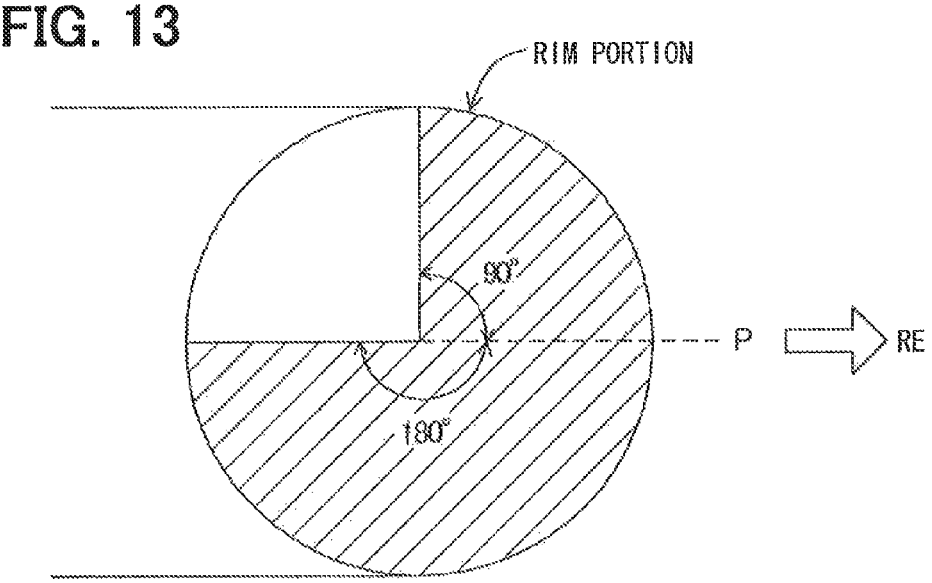
FIG. 13 is a diagram showing a region where the ring portion to be arranged.

FIG. 13 shows a cross section of the rim portion. As shown in FIG. 13, an imaginary plane P is defined as a plane which is parallel to a plane on which the rim portion is placed and includes an axis O of the rim portion. When a radially external direction shown by an arrow RE along the plane P is defined as a reference direction having zero degree, the ring portion may be arranged in a range within 90 degrees in the counterclockwise direction and a range within 180 degrees in the clockwise direction such that the ring portion is exposed to the outside of the rim portion. The range in which the ring portion may be arranged is shown by hatched lines in FIG. 13.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:
1. An information providing apparatus comprising:
a tactile information provider arranged within a rim portion of a steering wheel of a vehicle, the tactile information provider providing a tactile sense to a driver of the vehicle; and a controller that controls the tactile information provider to provide support information to the driver, the support information being defined as information that supports a driving of the vehicle, wherein the tactile information provider includes:
- a trench arranged in a circumferential direction of the rim portion;
- a ring portion having a ring-shape and rotatably arranged in the trench, the ring portion having an exposed surface such that the exposed surface contacts with at least one hand of the driver; and
- a driving portion that drives the ring portion to rotate in the circumferential direction, and wherein the controller controls the driving portion to rotate the ring portion so that the ring portion provides the support information to the driver.

2. The information providing apparatus according to claim 1,
wherein the ring portion is arranged at a radially external portion of the rim portion.

3. The information providing apparatus according to claim 1,
wherein the exposed surface of the ring portion has at least one of a recessed part and a protruded part.

4. The information providing apparatus according to claim 1,
wherein the support information includes at least one of a steering direction of the steering wheel, a steering angle of the steering wheel, a direction switch time of the steering wheel, and a vibration warning of the steering wheel.

5. The information providing apparatus according to claim 1,
wherein a notify mode of the support information to the driver includes at least one of a continuous rotation mode, an intermittent rotation mode, and a vibration mode.

6. The information providing apparatus according to claim 5,
wherein the support information is provided to the driver via at least one of a rotation direction of the ring portion, a rotation angle of the ring portion, a rotation speed of the ring portion, and a vibration period of the ring portion, 7. The information providing apparatus according to claim 1, further comprising:
- a state detector equipped to the vehicle, the state detector detecting at least one of a surrounding state and a vehicle state of the vehicle based on a detection signal transmitted from a sensor unit, which is equipped to the vehicle; and
- a support information generator generating the support information based on the at least one of the surrounding state and the vehicle state of the vehicle.

* * * * *